United States Patent [19]

Yilit

[11] 4,306,825
[45] Dec. 22, 1981

[54] ROUND BALE HANDLING APPARATUS

[76] Inventor: Stephen Yilit, Box 226, R.D. #2, Avella, Pa. 15312

[21] Appl. No.: 127,475

[22] Filed: Mar. 5, 1980

[51] Int. Cl.³ .............................. B60P 1/16; B66F 9/18
[52] U.S. Cl. .................................. 414/24.5; 414/703; 414/785
[58] Field of Search .................. 414/24.5, 24.6, 664, 414/668, 684, 703, 785, 911; 294/61, 87R, 87.28

[56] References Cited

U.S. PATENT DOCUMENTS

| | | | |
|---|---|---|---|
| 2,727,640 | 12/1955 | McClenny | 414/703 |
| 2,760,660 | 8/1956 | Garner et al. | 414/685 |
| 3,957,167 | 5/1976 | Jacobson et al. | 414/703 |
| 3,967,742 | 7/1976 | Meinert | 414/24.5 |
| 4,037,741 | 7/1977 | Smith | 414/911 X |
| 4,084,707 | 4/1978 | McFarland | 414/24.6 |
| 4,091,947 | 5/1978 | Fischer | 414/703 |
| 4,120,405 | 10/1978 | Jones et al. | 414/684 |

*Primary Examiner*—Leslie J. Paperner
*Attorney, Agent, or Firm*—Buell, Blenko, Ziesenheim & Beck

[57] ABSTRACT

A round bale carrier is provided for use on a three-point hitch tractor, said apparatus having an elongate frame member with a vertical center post and couplings on the center post and frame member for attachment to the three-point hitch, a plurality of elongate tines pivoted on the frame member and extending normally parallel to the direction of tractor travel, non-rotation means on the tines and means on the frame member for independently pivoting each tine in a vertical plane around its pivot on the frame member.

7 Claims, 3 Drawing Figures

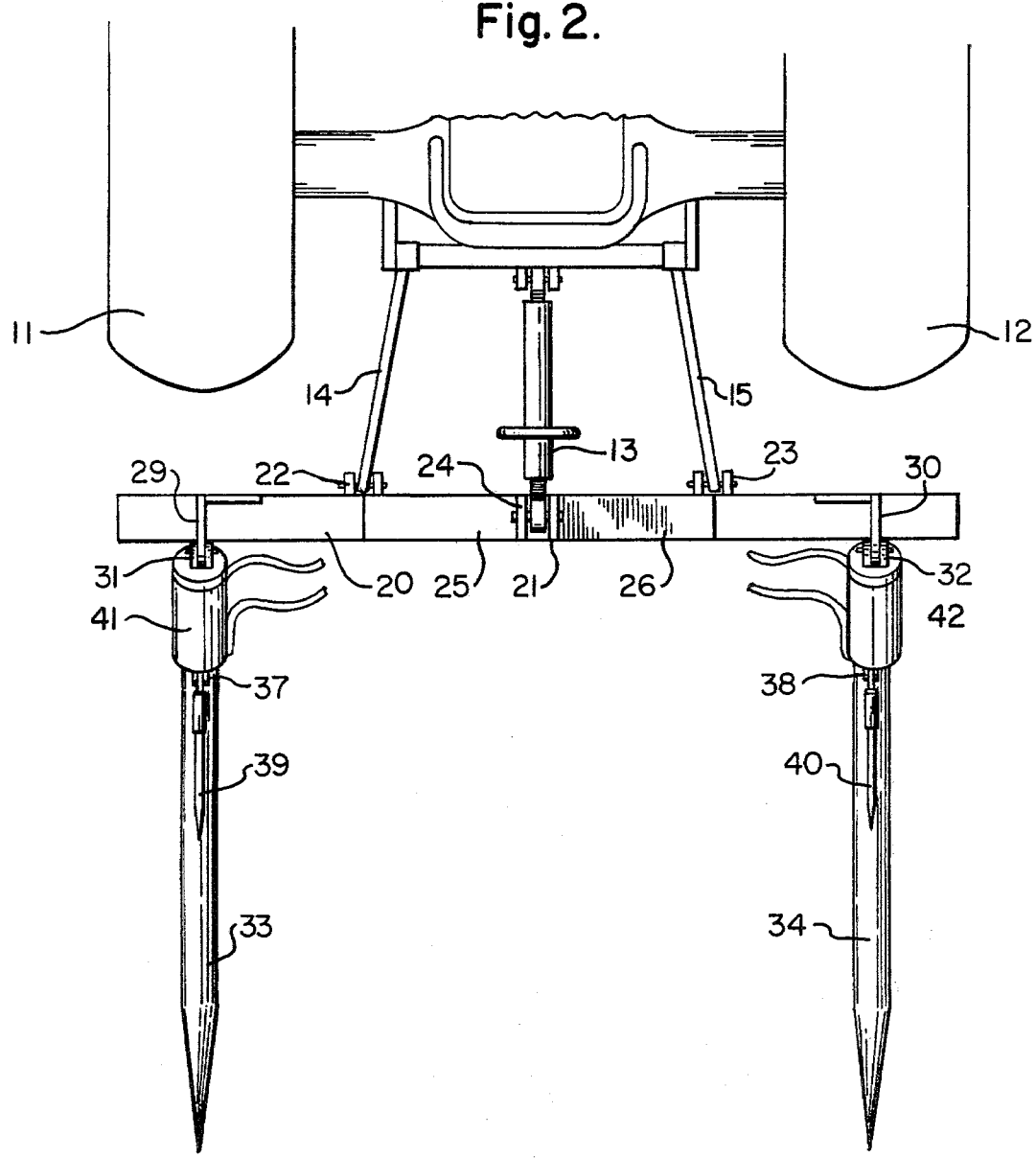

ROUND BALE HANDLING APPARATUS

This invention relates to round bale handling apparatus and particularly to an apparatus for selectively picking up and discharging each one of a plurality of round bales.

The handling of bales of hay has always been difficult, heavy and tiring work. The introduction of the massive round bale in recent years has made it impossible to manually lift and handle individual bales because their weight runs into hundreds of pounds each. As a result, there have been many devices proposed for handling such bales either from a front loader or from a three-point hitch arrangement. These prior art loaders are generally of three types. One type has a pair of arms with transverse pins at one end adapted to engage a bale, generally at its axis, on opposite sides. Typical of such apparatus are Van Polen U.S. Pat. No. 3,880,305, Brummitt U.S. Pat. No. 3,908,846, Hostetler U.S. Pat. No. 4,044,963 and Carter et al. U.S. Pat. No. 4,148,399.

A second type has a pair of arms which pass beneath the circumference of a bale and cradle it on the arms. Typical of such apparatus are Blair U.S. Pat. No. 4,032,184 and Fischer U.S. Pat. No. 4,091,947. A third form of apparatus uses a spear type lift arrangement. Typical of this form of bale handling equipment are Vandewater U.S. Pat. No. 3,921,837, Martin U.S. Pat. No. 3,934,726, Cox U.S. Pat. No. 4,015,739, McFarland U.S. Pat. No. 4,084,707, Cox U.S. Pat. No. 4,099,629 and Jones U.S. Pat. No. 4,120,405. These patented structures are all designed to handle a single bale except the Fischer U.S. Pat. No. 4,091,947 which is a multiple cradle arrangement. Most are unduly complex in structure and of limited ability to handle bales.

The present invention provides a structure which makes it possible to handle a plurality of bales each independently of the other, making it possible to pick up or discharge one bale from the plurality of bales without disturbing the others.

I provide a round bale carrier for handling a plurality of bales and adapted to be mounted on a tractor having a pair of rear drive wheels and a three-point hitch intermediate the rear wheels comprising an elongate frame member, a first vertical post on said frame member at substantially the mid-point thereof, coupling means on said elongate frame member substantially equadistant from said first vertical post for engaging two members of said three-point hitch, a coupling means on the first vertical post spaced from the elongate member for engaging the third member of said three-point hitch on a tractor whereby the elongate frame is mounted on said tractor behind the drive wheels and transverse to the length of the tractor, a plurality of elongate spear like tines carrying anti-rotation means are pivoted on said elongate frame member at spaced points spaced apart substantially the diameter of a bale to be handled and extending generally parallel to the direction of travel of said tractor, a vertical post on said elongate frame at each tine pivot point, and drive means pivotally connecting each tine at a point spaced from the elongate member to the adjacent vertical post at a point spaced from the elongate member. Preferably, the drive means are hydraulic cylinders driven from the hydraulic system of the tractor. The spear like tines preferably have an effective length substantially equal to the length of a bale to be lifted. A vertical post is preferably provided on the tine spaced from the pivot point and carrying a short tine acting as an anti-rotation means in the bale. Preferably, the first vertical post has angular support arms extending from a point adjacent the coupling means thereon to a point adjacent each coupling means on the elongate frame member.

In the foregoing general description, I have set out certain objects, purposes, and advantages of my invention. Other objects, purposes and advantages of this invention will be apparent from a consideration of the following description and the accompanying drawings in which:

FIG. 2 is a top plan view of the apparatus of FIG. 1 attached to the three-point hitch of a tractor.

Figure 3:
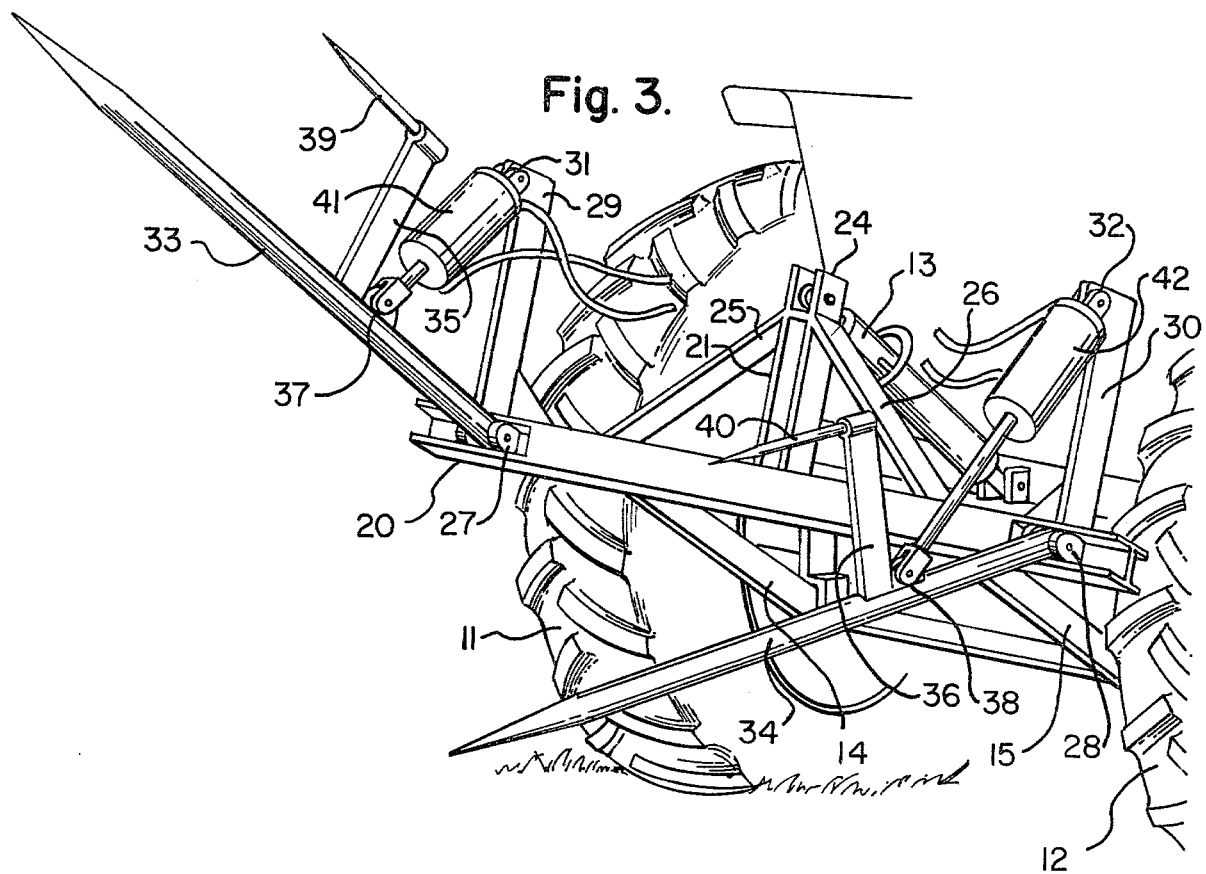
FIG. 3 is an isometric view of the apparatus of FIG. 1 on the three-point hitch of a tractor with one tine raised for carrying and the other tine lowered for pick up or discharage of a bale.
Figure 1:
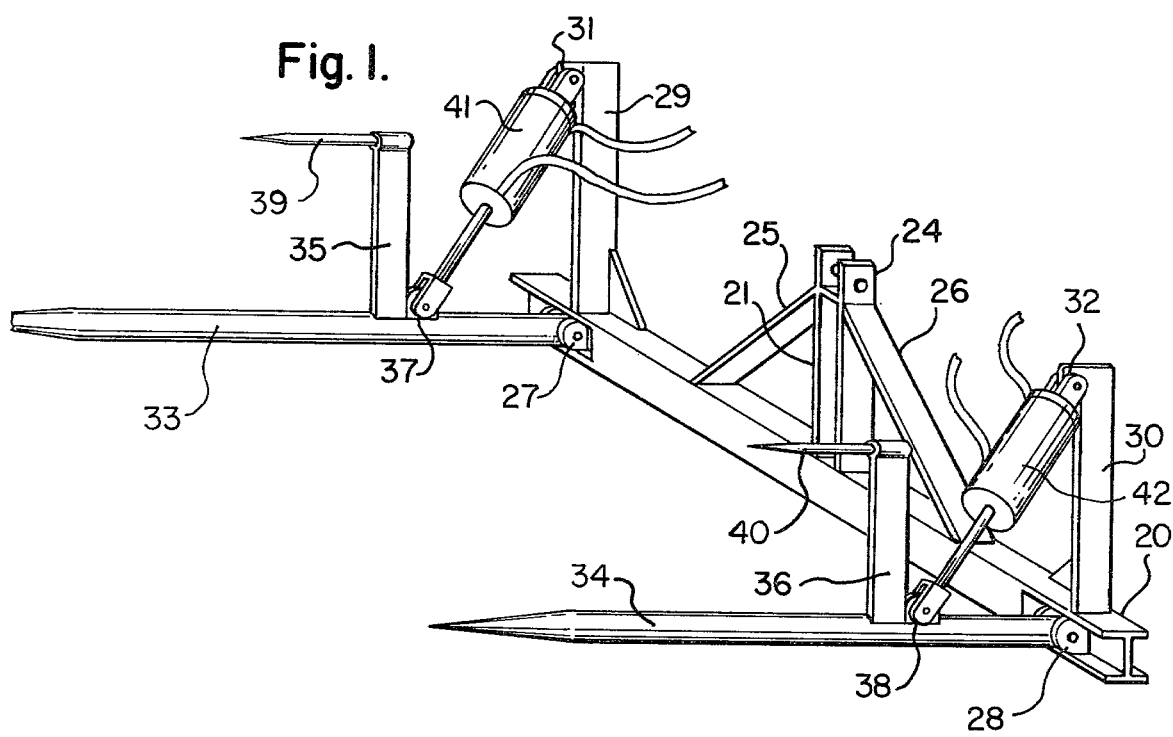
FIG. 1 is an isometric view of an apparatus according to this invention.

Referring to the drawings I have illustrated a round hay bale handling apparatus according to this invention on a tractor 10 of the agricultural type having a pair of rear drive wheels 11 and 12 and a three-point hitch projecting rearwardly from the tractor between the drive wheels. The three-point hitch shown is of conventional construction having an upper center link 13 and two lower outside hydraulically liftable links 14 and 15. This three-point hitch assembly may take any of the various forms manufactured by Massey Ferguson, Ford, International Harvester, Case, White, John Deere, Allis Fiat and most foreign tractor manufacturers.

The bale handling apparatus of this invention is made up of an elongate frame member 20 having a vertical post 21 at substantially its mid-point. Clevis means 22 and 23 are mounted on frame member 20 between post 21 and the ends of member 20 to pivotally receive the ends of lower links 14 and 15 of the tractor three-point hitch. A clevis 24 is provided on post 21 adjacent the end remote from elongate frame member 20 to pivotally receive the end of upper center link 13. Diagonal braces 25 and 26 extend from adjacent the top of post 21 to the elongate frame member 20 adjacent clevises 22 and 23. A pair of clevises 27 and 28 are provided on the elongate frame 20 adjacent the ends of the frame and on the opposite side from clevises 22 and 23. Vertical posts 29 and 30 parallel to post 21 are provided on elongate frame 20 at each of clevises 27 and 28. Each post 29 and 30 is provided with a clevis 31 and 32 adjacent its top. Bale supporting tines 33 and 34 are pivoted at one end in clevises 27 and 28. Each tine 33 and 34 is provided with a vertical post 35 and 36 and a clevis 37 and 38 spaced from clevis 27 and 28. The top end of each post 35 and 36 is provided with an anti-rotation or stabilizer spike 39 and 40 extending generally parallel of tines 33 and 34. A double acting hydraulic cylinder 41 and 42 connects each of clevises 37 and 38 on tines 33 and 34 with clevises 31 and 32 on posts 29 and 30.

In operation, in order to pick up one bale, the tractor with the bale handling apparatus is backed into the side of the bale with tine 33 generally parallel to the ground and the axis of the bale forcing tine 33 and spike 39 into the bale until the bale contacts post 29. The bale is lifted by energizing the three-point hitch to lift elongate frame member 20 and thereby to tilt the tine 33 and bale to the position of tine 33 shown in FIG. 3. In order to pick up a second bale, tine 34 is lowered as shown in FIG. 3 to a position generally paralleling the ground and the tractor again back into the side of a bale with tine 34 and spike 40 being forced into the bale until the bale contacts post 36. At this point, hydraulic cylinder 42 is energized to lift tine 34 about its pivot in clevis 28 to lift tine 34 and the bale on it to a position alongside tine 33 and the bale carried by it. Unloading a bale is accomplished by reversing the steps described above. One or both bales can be embodied at a given spot.

In the foregoing specification I have set out certain preferred practices and embodiments of my invention; however, it will be understood that this invention may be otherwise embodied within the scope of the following claims.

I claim:

1. A round bale carrier for handling a plurality of bales and adapted to be mounted on a tractor having a pair of rear drive wheels and three generally triangularly spaced members forming a three-point hitch intermediate the rear wheels comprising an elongate frame member, a first vertical center post on said frame member at substantially the mid-point thereof, coupling means on said elongate frame member substantially equidistant on each side of said first vertical center post for engaging two members of said three-point hitch, a coupling means on the first vertical center post spaced from the elongate member for engaging the third member of said three-point hitch on the tractor whereby the elongate frame is mounted on said tractor, behind the drive wheels and transverse to the length of the tractor, a plurality of elongate spear like tines carrying anti-rotation means pivoted on said elongate frame member at spaced points, each spaced apart substantially the diameter of a bale to be handled and extending generally parallel to the direction of travel of said tractor, a vertical tine post on said elongate frame at each tine pivot point, and drive means pivotally connecting each tine at a point spaced from the elongate member to the adjacent vertical tine post for separately and independently rotating each tine.

2. A round bale carrier as claimed in claim 1 wherein the drive means are hydraulic cylinders driven from a hydraulic system on the tractor.

3. A round bale carrier as claimed in claim 1 wherein the anti-rotation means is a spike generally parallel to and spaced from the tine, and vertical spike post means on said tine carrying said spike.

4. A round bale carrier as claimed in claim 1 or 2 or 3 having a pair of elongate spear like tines.

5. A round bale carrier for handling a plurality of bales and adapted to be mounted on a tractor having a three-point hitch extending rearwardly between a pair of rear drive wheels comprising an elongate frame member, a vertical center post intermediate the ends of said elongate frame member, spaced coupling means on said vertical center post and elongate frame member for attachment to a three-point hitch, a plurality of elongate tines pivoted on said frame member and extending normally parallel to the direction of tractor travel, said tines being spaced apart at least the diameter of a bale to be handled, non-rotational bale engaging means on each tine and means on the elongate frame member including a drive means at each tine pivot point for separately and independently pivoting each tine in a vertical plane around its pivot on the elongate frame member.

6. A round bale carrier as claimed in claim 5 wherein the means on the frame member for independently pivoting each tine includes a vertical spike post on the frame member adjacent each tine pivot and a hydraulic cylinder connecting said vertical post and tine at spaced points from said frame member.

7. A round bale carrier as claimed in claim 5 or 6 wherein the non-rotational bale engaging means on each tine is an elongate spike extending parallel to each tine and connected to said tine intermediate its length.

* * * * *